US012783518B1

(12) United States Patent
Salustino Guimaraes et al.

(10) Patent No.: US 12,783,518 B1
(45) Date of Patent: Nov. 3, 2026

(54) DATA DRIVEN OPTIMIZATION OF INFORMATION EXTRACTION

(71) Applicant: International Business Machines Corporation, Armonk, NY (US)

(72) Inventors: Valdir Salustino Guimaraes, São Paulo City (BR); Rodrigo Reis Alves, Sao Paulo (BR); Angelo Moore, Dunboyne (IE); Vasanthi M. Gopal, Plainsboro, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 19/253,130

(22) Filed: Jun. 27, 2025

(51) Int. Cl.
*G06F 16/2453* (2019.01)

(52) U.S. Cl.
CPC .............................. *G06F 16/24542* (2019.01)

(58) Field of Classification Search
None
See application file for complete search history.

(56) References Cited

U.S. PATENT DOCUMENTS

| | | | | |
|---|---|---|---|---|
| 10,409,911 | B2 | 9/2019 | Goyal et al. | |
| 10,956,786 | B2 | 3/2021 | Tecuci et al. | |
| 11,816,428 | B2 | 11/2023 | Begun et al. | |
| 12,182,512 | B2 * | 12/2024 | Theriappan | G06N 5/01 |
| 2010/0145902 | A1 | 6/2010 | Boyan et al. | |
| 2020/0193153 | A1 * | 6/2020 | Lee | G06F 40/226 |
| 2023/0119402 | A1 * | 4/2023 | Kumar | G06N 3/09 706/12 |

FOREIGN PATENT DOCUMENTS

| | | | |
|---|---|---|---|
| CN | 113505201 | A | 10/2021 |
| CN | 116186195 | A | 5/2023 |
| CN | 114358011 | B | 12/2024 |
| CN | 117764062 | B | 2/2025 |
| EP | 3757824 | A1 | 12/2020 |
| IN | 202441050324 | | 7/2025 |
| KR | 10-2713582 | B1 | 10/2024 |

OTHER PUBLICATIONS

Chen et al., "Generating Hierarchical Explanations on Text Classification via Feature Interaction Detection", Proceedings of the 58th Annual Meeting of the Association for Computational Linguistics, Jul. 2020, pp. 5578-5593.

* cited by examiner

*Primary Examiner* — Eddy Cheung
(74) *Attorney, Agent, or Firm* — Heather Schuler, Esq.; Heslin Rothenberg Farley & Mesiti P.C.; George S. Blasiak, Esq.

(57) ABSTRACT

Embodiments herein describe systems and techniques enabling effective use of tokenization for analysis and processing of text in natural language processing tasks. A disclosed system includes a text classifier model to perform predictions based on tokenized data and training data. In an embodiment, the text classifier model is used to generate a score for sentence tokens to be identified as a positive match to a query. In response to the text classifier model reaching a threshold score of prediction for a sentence, the sentence is tagged as a target sentence. A pre-defined window search of neighbor tokens is performed to determine a region of iterative similarity scores computed based on text from the knowledge base and a span of text from a document that includes the sentence, and an effective text span for a predicted data point is obtained based on the region of iterative similarity scores.

20 Claims, 10 Drawing Sheets

DATA DRIVEN OPTIMIZATION OF INFORMATION EXTRACTION

BACKGROUND

The present disclosure relates to digital processing systems, and more specifically, to methods for implementing enhanced efficiency and accuracy in natural language processing tasks.

Natural language processing (NLP) is a branch of artificial intelligence (AI) that has the ability to interrogate data with natural language text. NLP techniques depend on machine learning to understand, generate, and respond to human languages. NLP can be used to analyze documents and extract important data, reducing the time and cost of manual review.

SUMMARY

Disclosed embodiments provide methods, systems, and computer program products for identifying an effective text size for tokenization based on annotation data to enhance efficiency and accuracy in natural language processing (NPL) tasks, including performing tokenization independent of text extraction.

According to one embodiment of the present disclosure, a non-limiting computer-implemented method comprises performing, by a text classifier model, predictions based on tokenized data generated by a tokenization engine and annotation data of a knowledge base, wherein performing the predictions further comprises generating, by the text classifier model, a score for sentence tokens to be identified as a positive match to a query; and tagging, based on the text classifier model reaching a threshold score of prediction for a sentence, the sentence as a target sentence; performing a pre-defined window search of neighbor tokens to determine a region of iterative similarity scores computed based on text from the knowledge base and a span of text from a document that includes the target sentence; and obtaining, based on the region of iterative similarity scores, an effective text span for a predicted data point.

DETAILED DESCRIPTION

Figure 1:
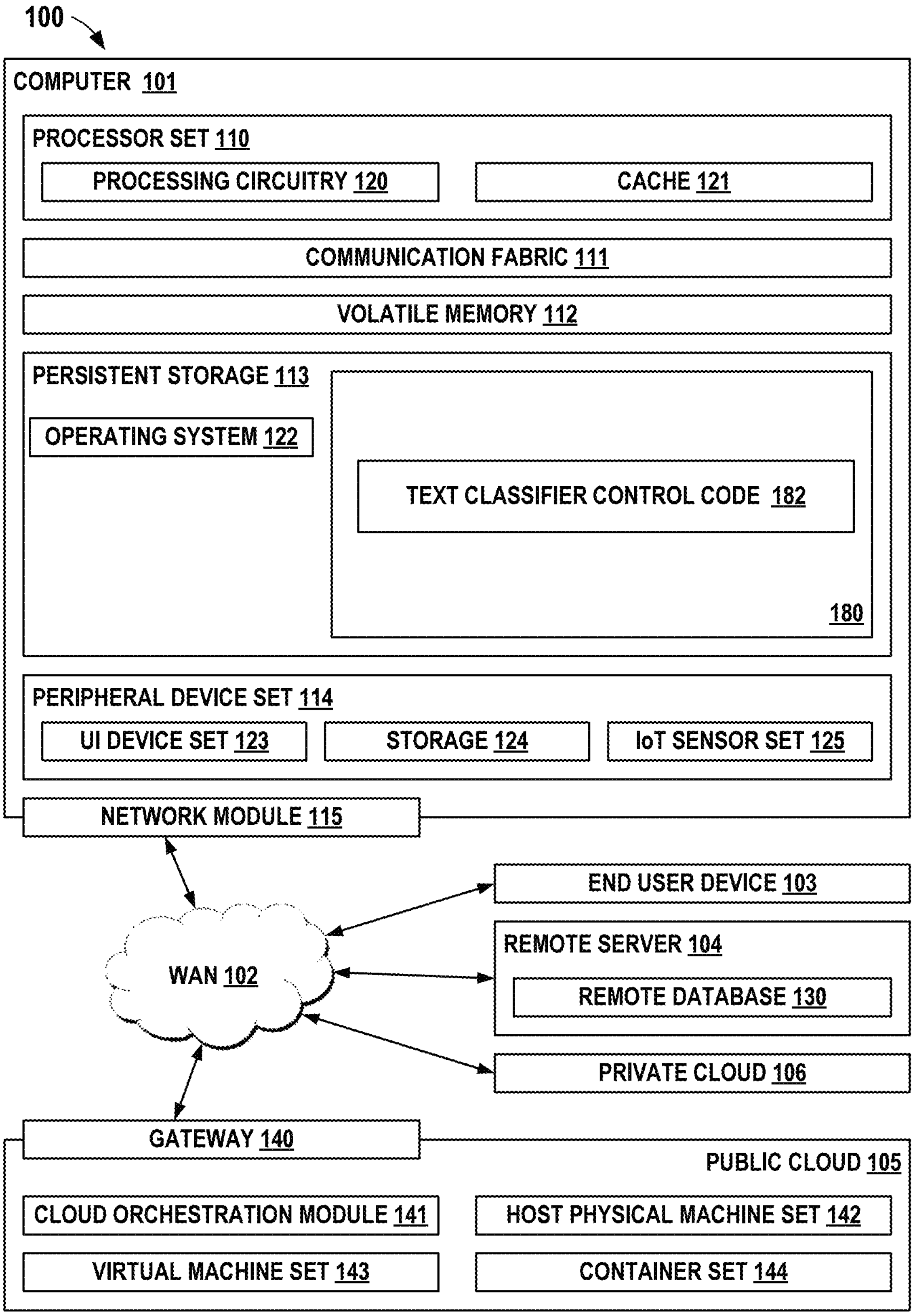
FIG. 1 is a block diagram of an example computer environment for use in conjunction with one or more disclosed embodiments.

In natural language processing (NLP), tokenization involves breaking down text into smaller units called tokens, which can be sentences, phrases, words, or characters to prepare text for analysis and processing by machine learning algorithms. Over-tokenization occurs when the text is split into too many small tokens, which can sometimes lead to a loss of context. For example, over-tokenization may occur when collections of scanned portable document format (PDF) documents are re-digitized to make their content available for indexing, search, analysis, reporting and processing. The quality of the original scan may affect that quality of the re-digitization process causing over-tokenization of text (e.g., tokenization noise), and creating many more sentence tokens (e.g., short sentence tokens for sentence fragments) than used in the original document. Over-tokenization may result in more processing time and memory usage, which is particularly problematic for large datasets. Over-tokenization may negatively impact the performance and accuracy of NLP models or NLP engines seeking to classify and grade specific conditions within the documents. Tokenization noise may cause misinterpretation of document text content processed by NLP models and render the NLP models blind to the conditions they are trained to detect and grade, thus reducing the performance and accuracy of automatic labelling, leading to the manual review and processing of more documents.

Embodiments herein describe systems and techniques that allow effective use of tokenization for analysis and processing of text in natural language processing tasks. A disclosed system includes a text classifier model performing predictions based on tokenized data by a tokenization engine and annotation data of a knowledge base. The tokenized data and the annotation data of the knowledge base have a set level or token size based on a given domain of the NLP tasks, such as a business domain, (e.g., business level annotation data) which can include a full clause (e.g., composed of multiple sentences) and entity identification within a sentence (such as duration, location, or the like). In an embodiment, the text classifier model is used to generate a score for sentence tokens to be identified as a positive match to a query (e.g., user's query or user input request in a natural language for a given NPL task). In an embodiment, the knowledge base includes annotation data by a subject matter expert (SME), for example at a given business level of annotation. In an embodiment, specific elements or annotation data points within the knowledge base can include text of one or more sentence tokens with a label, such as privacy, duration, location, or other label, which is based on the user's query for processing NLP tasks.

In an embodiment, in response to the text classifier model reaching a threshold score of prediction for a sentence, the sentence is tagged as a target sentence. In a disclosed method and system, a pre-defined window search of neighbor tokens is performed to determine a region of iterative similarity scores computed based on text from the knowledge base and a span of text from a document that includes the sentence, and obtain an effective text span for a predicted data point based on the region of iterative similarity scores. In an embodiment, the iterative similarity scores are computed based on a similarity algorithm by composing and decomposing sentence tokens within the pre-defined window search around the target sentence. The composing and decomposing sentence tokens includes merging a combination of contiguous sentences and tracking the iterative similarity scores of the merged combinations. In an embodiment, a text composition having the maximum threshold score of prediction for the tagged target sentence is retrieved as an optimum text span for the predicted data point.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a “circuit,” “module” or “system.”

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (“CPP embodiment” or “CPP”) is a term used in the present disclosure to describe any set of one, or more, storage media (also called “mediums”) collectively included in a set of one, or more, storage devices that collectively include machine readable code corresponding to instructions and/or data for performing computer operations specified in a given CPP claim. A “storage device” is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods at block 180, such as Text Classifier Control Component 182. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Embodiments of a disclosure provide a resource-efficient computing system that enables robust, effective and efficient natural language processing tasks that includes performing tokenization independent of text extraction. Disclosed embodiments describe methods to compose and decompose production textual data to extract a span of text with highest classification score, which is generically applicable in NLP domains. Methods are disclosed for merging and decomposition of unit tokens to retrieve an effective text span for a predicted data point from prediction operations.

Figure 2:
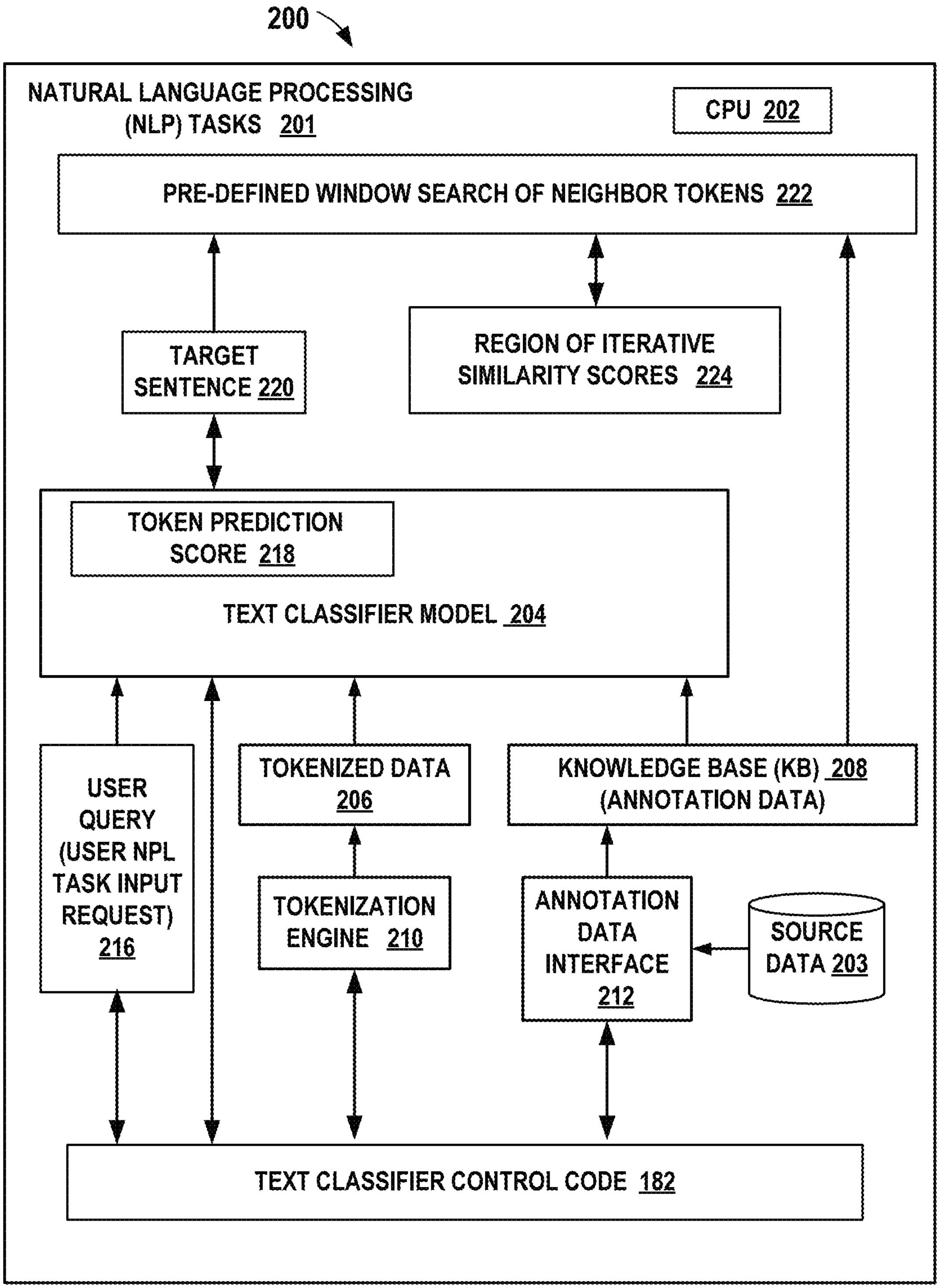
FIG. 2 is a diagram illustrating an example computer system for implementing effective text size for tokenization based on annotation data in NPL tasks of one or more embodiments of the present disclosure.

FIG. 2 illustrates an example computing system 200 for implementing enhanced efficiency and accuracy in natural language processing (NPL) tasks 201, including performing tokenization independent of text extraction of one or more disclosed embodiments. System 200 can be used in conjunction with the computer 101 and cloud environment of the computing environment 100 of FIG. 1 with the Text Classifier Control Code 182 for performing tokenization independent of text extraction of disclosed embodiments.

System 200 includes the processor set 110 of computer 101 that includes one or more central processor unit (CPU) 202 of a suitable implementation for processing NLP tasks 201 of disclosed embodiments. System 200 includes source data 203, which can include an extensive collection of documents, such as portfolio of active contracts for a given business use case.

In a disclosed embodiment, system 200 performs enhanced methods for implementing natural language processing (NLP) tasks 201 using a text classifier model 204 (also referred to herein simply as "classifier") to enhance efficiency and accuracy in processing NLP tasks 201. As shown, the text classifier model 204 receives inputs of tokenized data 206 and annotation data of a knowledge base (KB) 208 that includes for example, business level annotation data.

In an embodiment, the text classifier model 204 is trained with the tokenized data 206 that is generated by a tokenization engine 210, and the annotation data of the knowledge base 208 that is received from an annotation data interface 212, for example the annotation data has a selected domain level of annotation for a given domain of NLP tasks 201, such as business level annotation data. For example, the knowledge base 208 can include annotation data by a subject matter expert (SME) at a business level of annotation. The text classifier model 204 receives a user query 216 or a given user NPL task input request for processing. In an embodiment, a user can annotate data in free form, such as drag-selection approach to select multiple text of annotation data, for example, using the annotation data interface 212 for the free-form annotation process.

Figure 3:
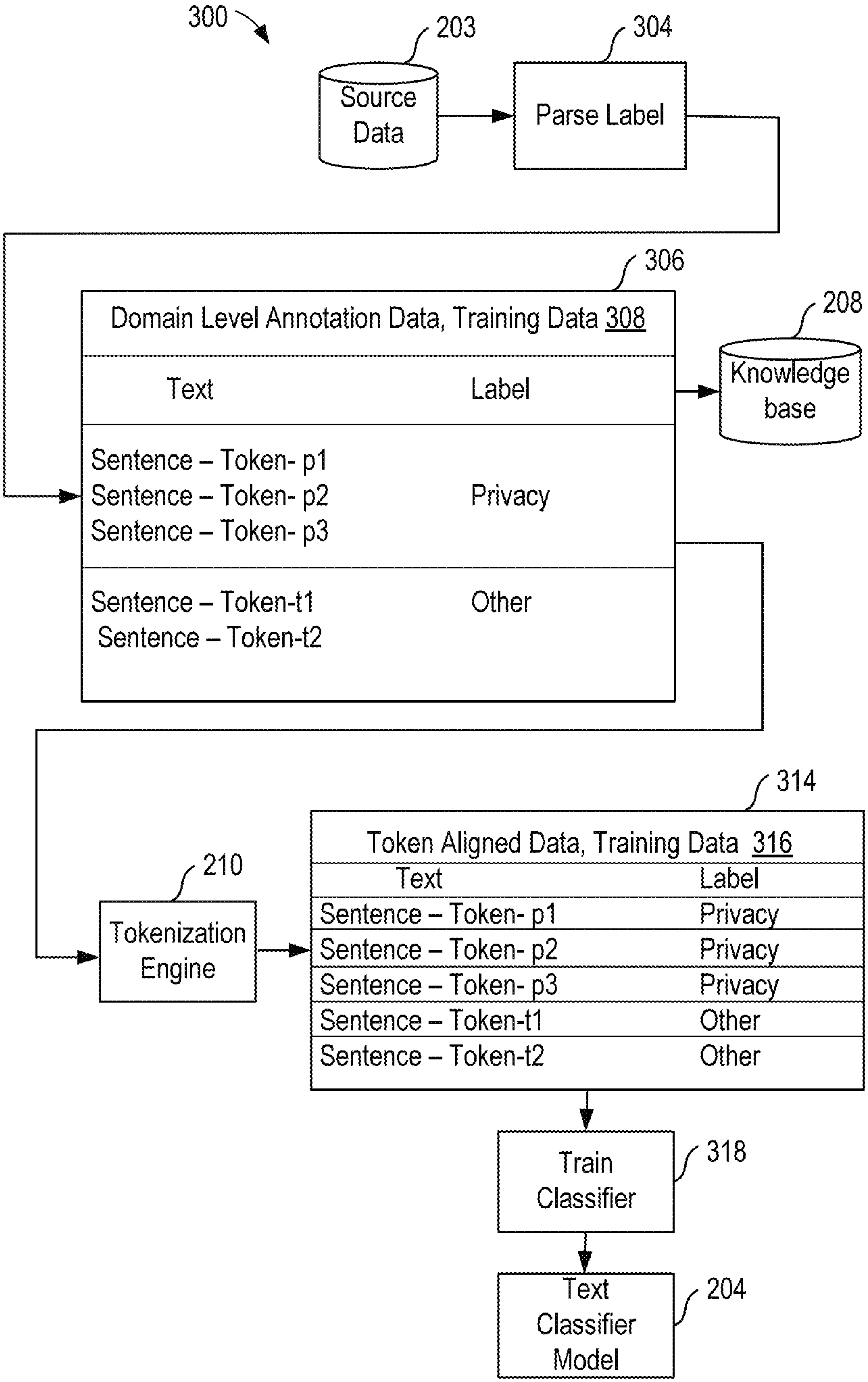
FIG. 3 is a diagram illustrating a workflow of example operations, components, and results of a process of data collection and training involved in performing the methods of one or more disclosed embodiments.

System 200, uses the text classifier model 204 to perform predictions using the tokenized data, such as illustrated and described below with respect to an example workflow 400 of FIG. 4 and an example method 500 of FIGS. 5A, 5B, 5C, 5D, and 5E. In performing the predictions, system 200 uses the text classifier model 204 to generate a score for unit tokens, the score referred to herein as a token prediction score 218, to be identified as a positive match to a given user query 216. It should be understood that the term 'sentence tokens' as used in FIGS. 3 and 4 herein includes unit tokens having a selected token size based on a given domain of the NLP tasks 201 in accordance with principles of the subject disclosed embodiments. For example, sentence tokens have a token size that is appropriate for a given use case of a business domain for analysis and processing of the NLP tasks 201. The data annotation at the level used by the business domain, which can include a full clause composed of multiple sentences and an entity identification within a sentence, such as duration, location, and the like. FIG. 3 illustrates example operations of data collection and training of disclosed embodiments.

Referring also to FIG. 3, a workflow 300 illustrates example operations of data collection and training involved in performing the methods of one or more disclosed embodiments. Workflow 300 can be implemented by system 200 in conjunction with the computer 101 of FIG. 1 and the Text Classifier Control Code 182 of disclosed embodiments. In FIG. 3, the same reference numbers are used to refer to identical or similar operations and components of system 200 as used in FIG. 2.

Workflow 300 starts with obtaining training data from a source data 203, which can include a data store of a collection of scanned documents to be re-digitized for processing and analysis for a specific use case of NLP tasks 201 of multiple domain areas. For example, source data 203 can include a process corpus of multiple scanned Portable Document Format (PDF) documents or contracts, (e.g., 70K PDF documents) such as for accounts receivable document (contract) labelling and grading. The source data 203 is coupled to a parser label 304 that converts unstructured or semi-structured data of source data 203 into a data set 306 of structured data and/or supervised data of domain level annotation data, training data 308, (e.g., business level annotation data, training data) at the level used by the business domain. The domain level annotation data, training data 308 includes a plurality of data points, which can include a full clause including multiple sentences, a single sentence, and/or entity identification within a sentence (such as, a time period or duration, a specific location, and the like). As shown, the data set 306 of domain level annotation data, training data 308 include multiple sentence tokens, each including text and a label. The illustrated domain level annotation data, training data 308 include multiple sentence tokens p1, p2, and p3 with a label of Privacy, and multiple sentence tokens t1, t2, with a label of Other, that refers to all other text not relevant to text to be extracted for NLP task processing. The illustrated domain level annotation data, training data 308 provide a knowledge base 208 for the given use case of NLP tasks 201 that is produced in the workflow 300 for training the text classifier model 204. The knowledge base 208 is used for similarity computation by a similarity model 426 of workflow 400 of FIG. 4. The domain level annotation data, training data 308 are applied to and tokenized by a tokenization engine 210 for the given use case. The tokenization engine 210 produces a data set 314 of token aligned data, training data 316 (such as the tokenized data 206 that is tokenized by the tokenization engine 210 of by system 200). In a classifier training step, the token aligned data training data 316 including text and label of the multiple sentence tokens and labels from the tokenization engine 210 is used by a train classifier 318, for example to train a given text classifier model 204, for the specific use case of NLP tasks 201 (such as tokenized data 206 used to train the text classifier model 204 of system 200).

Referring again to FIG. 2, the text classifier model 204 performs predictions using the same or common tokenization level of tokenized or production data and the annotation data, which includes the text classifier model 204 generating a token prediction score 218 of each sentence token to be identified as a positive match to a given user query 216 (e.g., a given user NPL task input request for a specific use case). During the process of inference, the text classifier model 204 compares the token prediction score 218 with a threshold score of prediction for a sentence. In response to the text classifier model 204 reaching the threshold score of prediction for a sentence, the sentence is tagged as a target sentence 220. System 200 performs a pre-defined window search of neighbor tokens 222 based on the target sentence 220 to determine a region of iterative similarity scores 224 computed based on text from the knowledge base 208 and a span of text from a document that includes the target sentence 220. System 200 obtains an effective text span for a predicted data point based on the region of iterative similarity scores for a given use case to process natural language processing tasks 201, where the optimum text span has the maximum similarity score. In an embodiment, system 200 performs the pre-defined window search based on the target sentence 220 using a target index of sentence tokens to select sentence tokens of the span of text from the document that includes the target sentence 220, and compares the iterative similarity scores of the selected sentence tokens to identify one or more candidates of merged sentence tokens that have a maximum similarity score. The iterative similarity scores 224 are computed based on text from the knowledge base 208 and a span of text from a document that includes the target sentence 220 (e.g., based on a given user query 216 for the given user NPL task input).

In an embodiment, system 200 computes the iterative similarity scores based on a similarity algorithm by composing and decomposing sentence tokens within the pre-defined window search 222 around the target sentence 220. The composing and decomposing the sentence tokens can include merging a combination of contiguous sentences and tracking the iterative similarity scores, where a text composition having a pre-defined threshold prediction score is retrieved as the effective text span for the predicted data point for a given use case to process natural language processing tasks. FIG. 4 illustrates example operations of a workflow to perform predictions using tokenized data and annotation data of disclosed embodiments.

Figure 4:
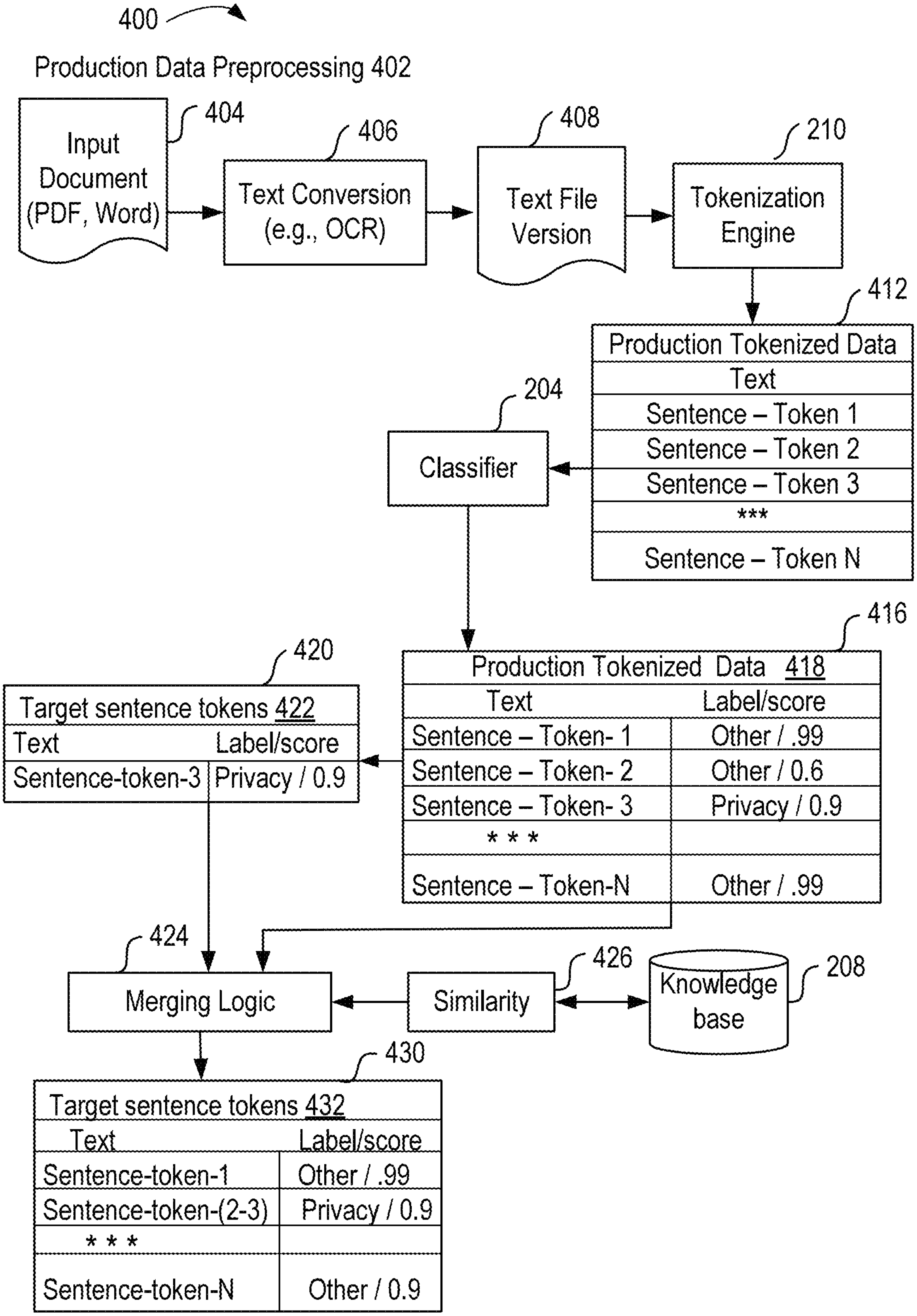
FIG. 4 is a diagram illustrating a workflow of example operations, components, and results of a process of inference involved in performing the methods of one or more disclosed embodiments.

In FIG. 4, a workflow 400 illustrates example operations, components, and results of a process of inference involved in performing the methods of one or more disclosed embodiments. Workflow 400 can be implemented by system 200 in conjunction with the computer 101 of FIG. 1 and the Text Classifier Control Code 182 of disclosed embodiments. In FIG. 4, the same reference numbers are used to refer to identical or similar operations and components of system 200 as used in FIG. 2.

Workflow 400 includes production data preprocessing 402 that includes receiving an input document 404, such as a PDF or Word document, which is applied to a text conversion component 406, such as an Optical Character Recognition (OCR) that analyzes images of text, identifies and converts individual characters into a digital text format or text file version 408. The production data preprocessing 402 includes a tokenization engine 210 that receives the text file version 408 that has a given digital text format, and provides a production data tokenized dataset 412. As shown, the production data tokenized dataset 412 includes text of multiple sentence tokens 1-N. The production data tokenized dataset 412 produced by the tokenization engine 210 can result from the production data preprocessing 402 of sentence classification, where in order to predict labels from sentence text, the classifier model 204 performs inference for predicting the labels of production tokenized data 418 of a data set 416 and of target sentence tokens 422 of a data set 420, which in conjunction with the merging logic 424 extract meaningful information from text without relying on a fixed, pre-defined tokenization process. For example, sentence tokenization can split the text in period character (.) or using a robust set of rules such as in a Natural Language Toolkit (NLTK) sentence tokenizer to process text at the character level, learning representations directly from sequences of characters without relying on pre-defined word boundaries.

For example, referring to the following Example Clause 1 and consider a use case to annotate sentences related to a Data Security and Privacy (DSP) clause in a legal document including the following data point whose label is "privacy":

Example Clause 1

1. Privacy

"8.2 By entering into the Agreement, Client is entering into EU Standard Contractual Clauses as set out in the applicable DPA Exhibit (EU SCC) with (i) each Subprocessor listed in the respective DPA Exhibit that is an affiliate located in a Non-Adequate Country (Data Importers) and (ii), Supplier, if located in a Non-Adequate Country, as follows:

(a) if Client is a Controller of all or part of the Client Personal Data, Client is entering into the EU SCC in respect to such Client Personal Data; and (b) if Client is acting as Processor on behalf of other Controllers of all or part of the Client Personal Data, then Client is entering into the EU SCC:

(i) as back-to-back EU SCC in accordance with Clause 11 of the EU Standard Contractual Clauses (Back-to-Back SCC), provided that Client has entered into separate EU Standard Contractual Clauses with the Controllers; or (ii) on behalf of the other Controller(s)."

Consider as an example, to train a classifier 204 to find the Example Clause 1 in a user document (PDF or Word file) 404, assuming an existing sample of clauses for privacy are available, where each clause data point is arranged as in the above Example Clause 1 and provides a supervised data set, such as data set 412. Workflow 400 includes performing the step of production data preprocessing 402 of a given user document 404 to predict if the given clause is present in the user document 404. The production data preprocessing 402 performs OCR text conversion and the output can be a text object (e.g., containing all of the text of the PDF or Word document 404) or an array of sentence tokens. In the case of sentence tokens, and depending on the sentence tokenization engine 210 the above Example Clause 1 can be tokenized as shown in TABLE 1 as follows:

TABLE 1

| Index | Sentence tokens |
|---|---|
| 0 | 8.2 By entering into the Agreement, Client is entering into EU Standard Contractual Clauses as set out in the applicable DPA Exhibit (EU SCC) with |
| 1 | (i) each Subprocessor listed in the respective DPA Exhibit that is an affiliate located in a Non-Adequate Country (Supplier Data Importers) and |
| 2 | (ii) Supplier, if located in a Non- Adequate Country, as follows: |
| 3 | a) if Client is a Controller of all or part of the Client Personal Data, Client is entering into the EU SCC in respect to such Client Personal Data; and |
| 4 | b) if Client is acting as Processor on behalf of other Controllers of all or part of the Client Personal Data, then Client is entering into the EU SCC: |
| 5 | (i) as back-to-back EU SCC in accordance with Clause 11 of the EU Standard Contractual Clauses (Back-to-Back SCC), provided that Client has entered into separate EU Standard Contractual Clauses with the Controllers; or |
| 6 | (ii) on behalf of the other Controller(s). |

Given the above Example Clause 1, the classifier 204 is trained with sentence tokens from the above TABLE 1 and the knowledge base 208 that includes the text of the above Example Clause 1. Note in the example TABLE 1 the tokenization engine 210 split the given text file version 408 using a bulleting and enumerator pattern, such as (i), a), b), and the like. Note that the first three characters are not split although in the presence of the period char ("8.2") with learning representations directly from sequences of characters of the above TABLE 1 with the tokenization independent text extraction of disclosed embodiments.

In FIG. 4, workflow 400 illustrates a disclosed process of inference that includes performing tokenization independent of text extraction, where the data set 412 of production tokenized data text from the digital text file 408 is applied to the text classifier model 204 of system 200 and a data set 416 of production tokenized data 418 is produced by the classifier 204. The data set 416 includes text of a plurality of sentence tokens, each sentence token including a generated score and a label, where the label represents an annotation of an attribute, such as an entity identification within a sentence (e.g., a time period or duration, such as 90 days, a location, such as a Non-Adequate Country, or privacy for the above Example Clause 1. As shown, the data set 416 of production tokenized data 418 includes text (e.g., sentence tokens 1-N), and a label (e.g., Privacy or Other) and score (e.g., 0.99, 0.6, 0.9) produced by using the text classifier model 204 that generates the label and the score for each of the sentence tokens 1-N. When the classifier 204 reaches a threshold score of prediction for a sentence, e.g., of the sentence tokens 1-N, the classifier 204 tags the sentence as a target sentence 420 that is stored in the data set 420 of target sentence tokens 422 (e.g., as shown in FIG. 2, the text classifier model 204 computes the token prediction score 218. Target sentence tokens 422 (which have the labels of interest, such as privacy) are selected and stored in the data set 420. The data set 420 of data points or target sentence tokens 422 includes text (e.g., sentence token 3), and a label (e.g., Privacy) and score (e.g., 0.9), as shown. The production sentence tokens of the production tokenized data 418 and the target sentence tokens 422 of the data set 420 are applied to a merging logic 424, which uses a similarity function 426 to perform the pre-defined window search. The merging logic 424 processes iterative inference operations of the pre-defined window search 222 and retrieves merged sentence tokens that have a maximum similarity score. The similarity function 426, e.g., similarity algorithm, used in conjunction with the merging logic 424 and the knowledge base 208 to perform the pre-defined window search of neighbor tokens 222 to determine a region of iterative similarity scores 224, which is computed based on text from the knowledge base 208 and a span of text from a document that includes the target sentence 220. In an embodiment, the iterative similarity score computation is made by the similarity algorithm 426 by composing and decomposing (e.g., merging and decomposing) sentences tokens within the window search 222 around the target sentence 220. The composing and decomposing logic of similarity function 426 iterates by merging a text combination of contiguous sentences, and keeping track of the similarity scores of the merged text combination. The text composition that has the maximum prediction score is retrieved as the effective text span of the predicted data point. As shown, the merging logic 424 stores merged results in a data set 430 of target sentence tokens 432, which includes sentence token 1, combined or merged sentence tokens 2-3, and sentence token N with label and score values. In one embodiment, the merging logic 424 can store decomposed sentence token in the dataset 430 of target sentence tokens in case of decomposition of the sentence token to retrieve the entity with maximum similarity score (e.g., a time period or duration, such as 90 days, a location, such as a Non-Adequate Country, and the like).

FIGS. 5A, 5B, 5C, 5D, and 5E together provide a flow chart illustrating example operations of a method 500 for implementing an optimal effective text size for tokenization based on annotation data in NPL tasks of one or more disclosed embodiments, and that includes performing tokenization independent of text extraction. Method 500 can be implemented by system 200 in conjunction with the computer 101 of FIG. 1 and the Text Classifier Control Code 182 of disclosed embodiments. The usage of the classifier 204 trained in workflow 300 of FIG. 3, and the similarity algorithm 426 with the knowledge base 208 in workflow 400 of FIG. 4 are illustrated in respective processing steps in FIGS. 5A, 5B, 5C, 5D, and 5E. In FIGS. 5A, 5B, 5C, 5D, and 5E, the same reference numbers are used to refer to identical or similar operations and components of system 200 as used in FIG. 2.

Figure 5A:
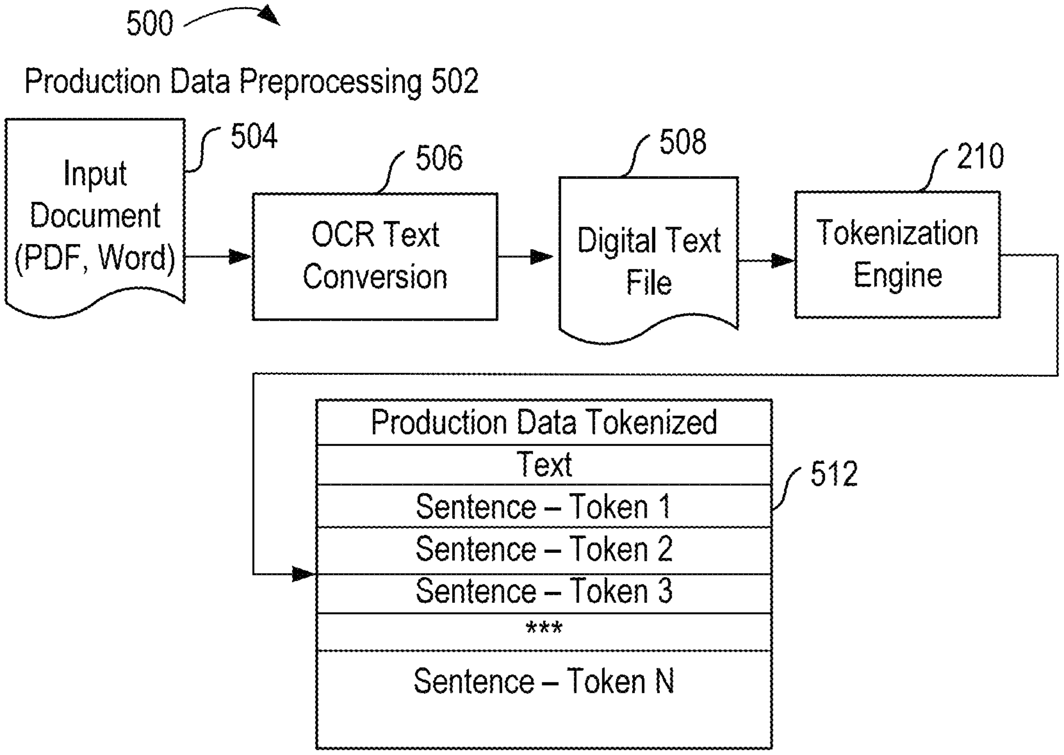
FIGS. 5A, 5B, 5C, 5D, and 5E together provide a flow chart illustrating example operations of a method for implementing effective text size for tokenization based on annotation data in NPL tasks of one or more disclosed embodiments.

FIG. 5A illustrates operations of a first processing step of production data preprocessing 502 of method 500, such as described in detail above with respect to the workflow 400 of FIG. 4, that starts with system 200 receiving an input document 504, such as a PDF or Word document, for example to predict if a given sentence is present in the user document. System 200 applies the user document 504 to an OCR text conversion component 506 that converts individual characters into a digital text file 508. The digital text file 508 can include a text object containing all the text of the PDF or Word document 504 or an array of sentence tokens. The production data preprocessing 502 includes a given tokenization engine 210 that performs tokenization, receiving the digital text file 508 that has a given digital text format, and provides a production data tokenized dataset 512. As shown, the production data tokenized dataset 512 includes text of a plurality of sentence tokens 1-N. For example, tokenization engine 210 can tokenize the Example Clause 1 providing the production data tokenized dataset 512. The production data tokenized dataset 512 produced by the tokenization engine 210 results from the production data preprocessing 502 of sentence level classification. In order to predict labels and scores of the sentence tokens 1-N from sentence text, the production data tokenized dataset 512 is applied to the text classifier model 204 that generates the label and the score for each of the sentence tokens 1-N such as illustrated in target sentence detection 520 of FIG. 5B.

Figure 5B:
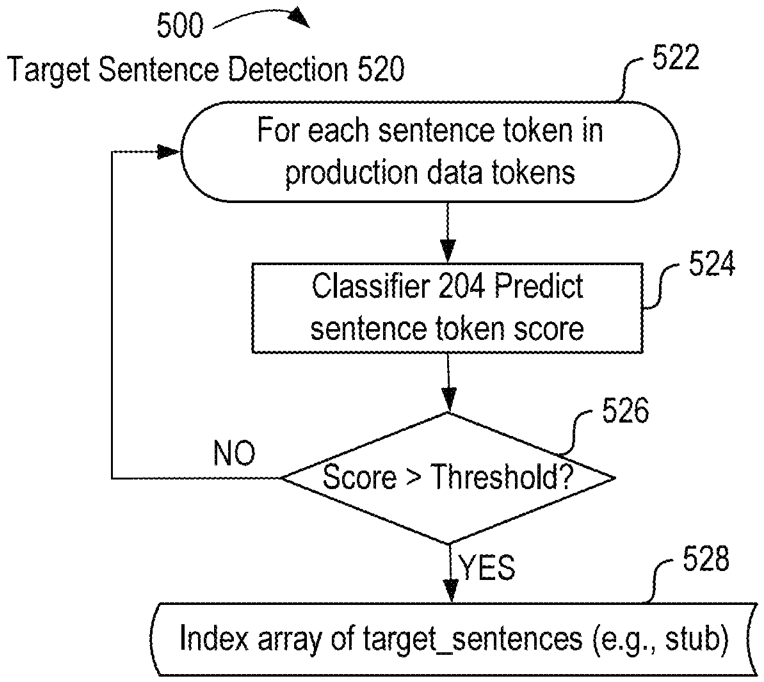

Referring to FIG. 5B, there are shown example operations of the target sentence detection 520 of method 500 of one or more disclosed embodiments. The target sentence detection 520 illustrates a second processing step to select target sentence tokens using classifier prediction. The target sentence detection step 520 begins at block 522 where system 200 obtains for each sentence token in the sentence tokens 1-N of data set 512 for processing. At block 524, the classifier 204 predicts a sentence token score for each sentence token in the sentence tokens 1-N (e.g., token prediction score 218). In an embodiment, predicting the sentence token score further comprises identifying a label for the sentence tokens that represents an annotation attribute of a given data point to be identified as the positive match to the query (e.g., the label comprises one or more of an entity identification, a time duration, a location, or privacy for the sentence tokens). At decision block 526, the predicted sentence token score is compared with a predefined threshold score of prediction for the sentence tokens. When the predicted sentence-token score is less than the pre-defined threshold score, system 200 returns to block 522 and continues to process a next sentence token. When the predicted sentence-token score reaches or exceeds the predefined threshold score, system 200 updates or produces an index array of target sentences (e.g., stub) at block 528. For example, the stub of index array of target sentences at provides a placeholder function or object for target sentences while the target sentences function is being processed.

Figure 5C:
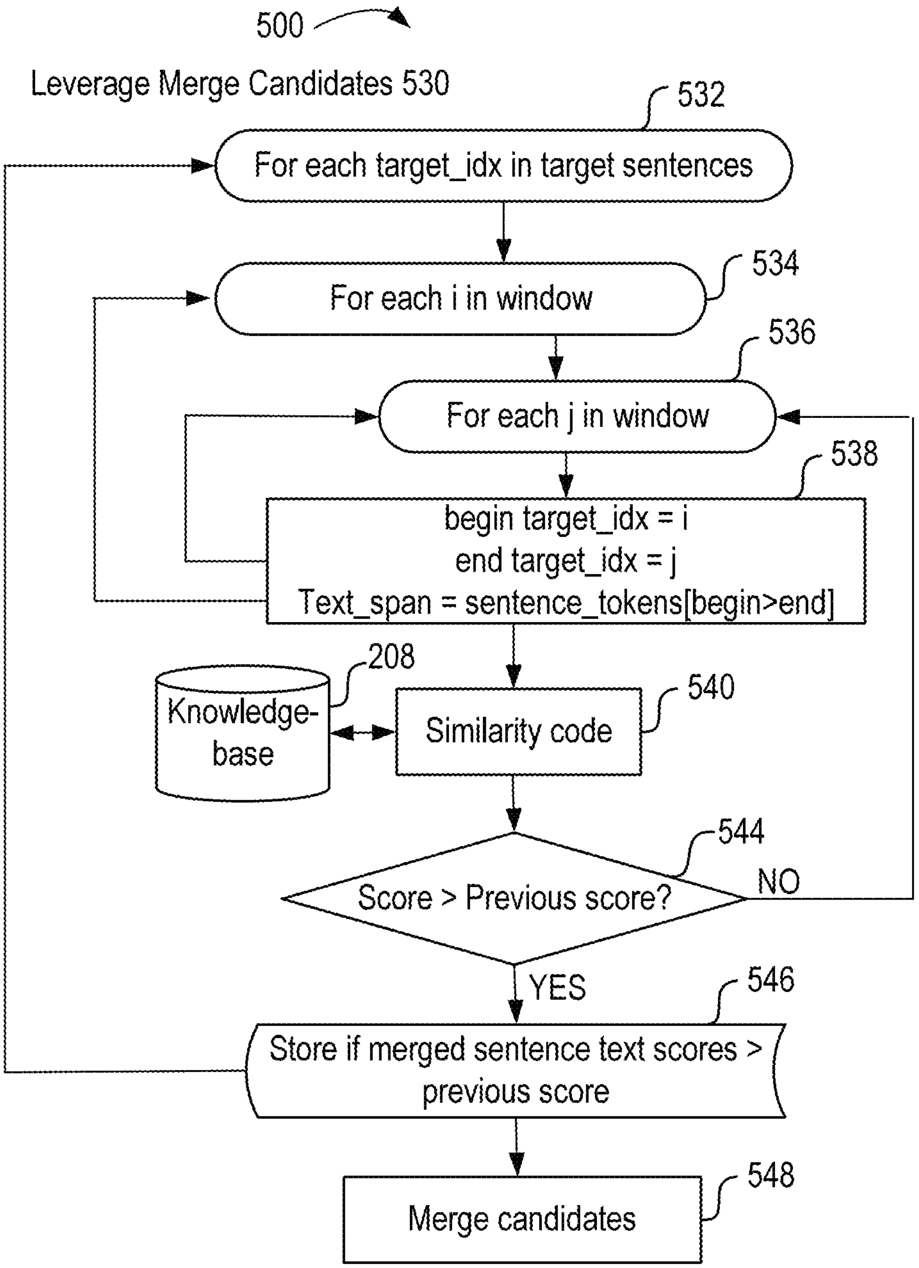

FIG. 5C illustrates example operations of leverage merge candidates 530 of method 500 of one or more disclosed embodiments. The leverage merge candidates 530 illustrates a third processing step that represents the iterative similarity score calculation according to a pre-defined window and storing score results for further processing. The leverage merge candidates step 530 starts at block 532 where system 200 obtains for each target_idx from target sentences 422, at block 534 for each i in window, and at block 536 for each j in window, for a pre-defined window search of neighbor tokens 222, where idx represents the index (or identifier)

used to access a particular target sentence token or data point in the index array of target sentences of target sentence detection step 520, (e.g., with reference to workflow 400 of FIG. 4, the data set 416 of production tokenized data 418 and data set 420 of target sentence tokens 422). At block 538, system 200 begins at target_idx=i, and ends at target_idx=j with a Text_span=sentence tokens [begin>end] to process a window search of neighbor tokens 222. At block 540, system 200 executes similarity code used with knowledge base 208 and stores score results of the iterative similarity score calculation in the knowledge base 208 for further processing. At decision block 544, system 200 compares the predicted score with the previous predicted score of the iterative similarity score calculation. When the predicted score is less than the previous predicted score, operations return to block 536 for a next index j in the window search and continues operations. When the predicted score exceeds the previous predicted score, system 200 stores the predicted score of the merged sentence text scores that exceed or are greater than the previous predicted score at block 546, and returns to block 532 and continues operations. At block 548, system 200 produces merge_candidates. With reference again to workflow 400 of FIG. 4, the illustrated data set 430 of target sentence tokens 432 include merged sentence tokens 2-3 with a privacy label and score of 0.9.

Figure 5D:
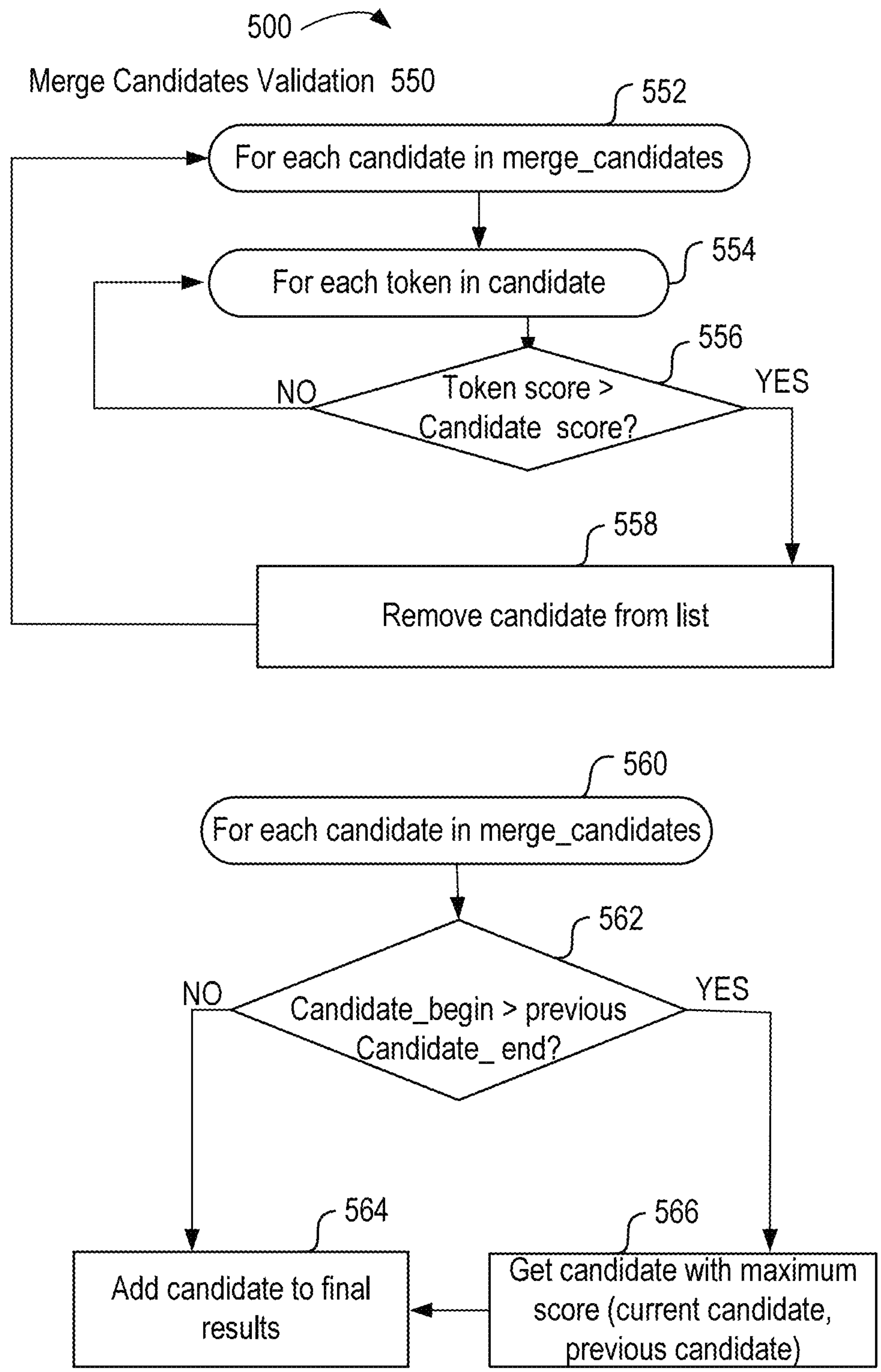

FIG. 5D illustrates example operations of merge candidates validation 550 of method 500 of one or more disclosed embodiments. A fourth processing step illustrated by the merge candidates validation 550 includes a first logic step and a second logic step, where the first logic step filters candidates of lower similarity score and the second logic step solves the conflict of overlapping candidates. The merge candidates validation 550 includes the first logic step starting at block 552 where system 200 obtains for each candidate in the merge_candidates, (e.g., produced at block 548 in FIG. 5C) and for each token in the candidate at block 554 for processing. At decision block 556, system 200 compares the token score with the candidate score. When the token score is not greater than the candidate score, operations return to block 554 to process a next token. When the token score is greater than the candidate score, at block 558, system 200 removes the candidate from the merge_candidates list to filter candidates of lower similarity score, and operations return to block 552 to process a next candidate.

The second logic step of the merge candidates validation 550 solves conflict of overlapping candidates, starting at block 560 where system 200 obtains for processing each candidate in the merge_candidates. At decision block 562 determines for the candidate whether the candidate_begin is greater than the previous candidate_end. When the candidate_begin is less than the previous candidate_end, system 200 adds the current candidate to the final results at block 564. When candidate_begin is greater than previous candidate_end, system 200 gets the candidate with the maximum score (current candidate, previous candidate) at block 566, and adds the candidate to the final results at block 564. For example, candidate_1={indexes: [3, 4, 5], score: 0.7} and candidate_2={indexes: [4, 5, 6], score: 0.9} and system 200 selects the candidate of higher similarity score which in this example is candidate_2 and candidate_1 is removed from merging, as illustrated in FIG. 6.

Figure 5E:
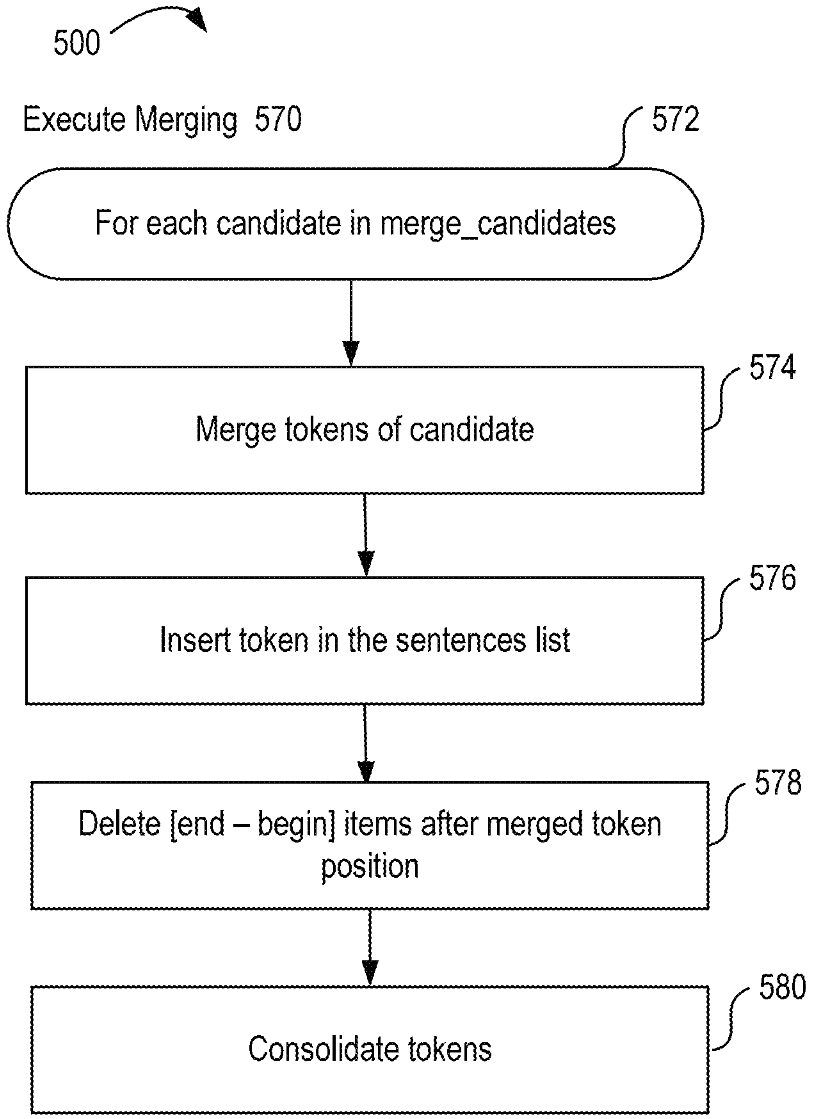

FIG. 5E illustrates example operations of execute merging 570 of method 500 of one or more disclosed embodiments. The execute merging 570 illustrates a fifth processing step that performs merge token processing and removes sentence tokens already present in the merged sentences. The execute merging step 570 begins at block 572, where system 200 obtains for processing each candidate in merge_candidates. At block 574, system 200 merges tokens of the candidate, and inserts the merged token in the sentences list at block 576. At block 578, system 200 deletes [end-begin] items after the merged token position. At block 580, system 200 consolidates the tokens, (e.g., sentence tokens) in the merged sentences. For example, candidate_1={indexes: [3, 4, 5], score: 0.7} and candidate_2={indexes: [4, 5, 6], score: 0.9} and system 200 selects the candidate of higher similarity score which in this example is candidate_2 and candidate_1 is removed from merging, as illustrated in FIG. 6.

Figure 6:
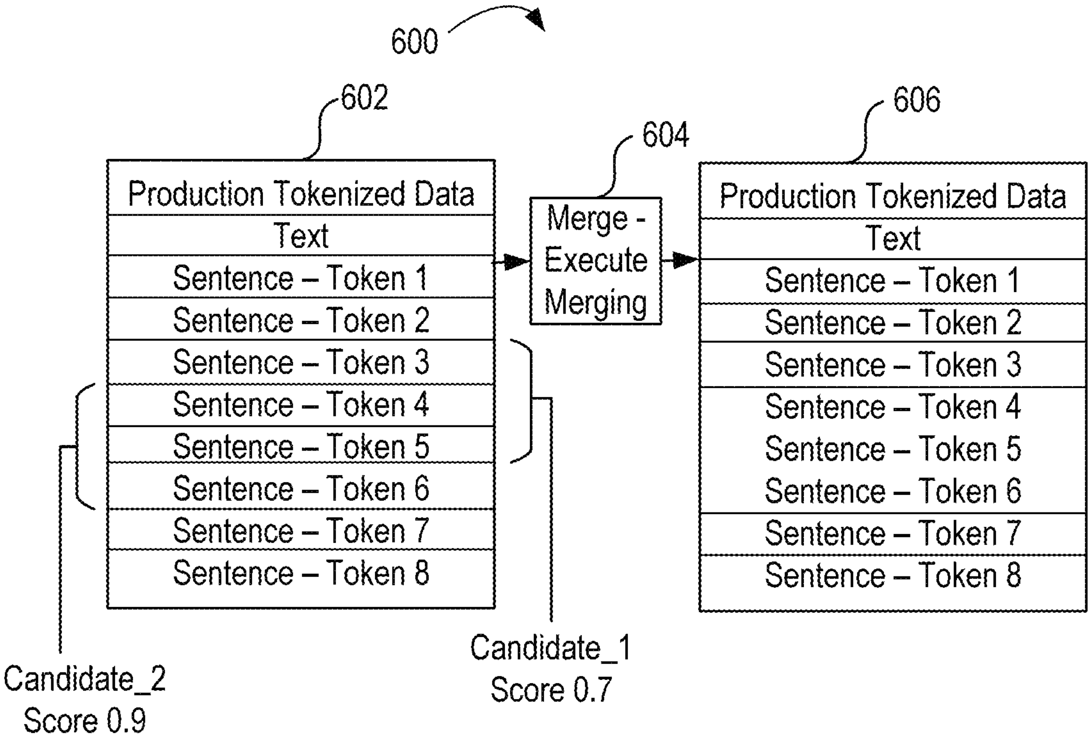
FIG. 6 is a diagram illustrating example operations, and results of the workflow of FIG. 4 and the method of FIGS. 5A, 5B, 5C, 5D, and 5E for implementing an effective text span based on annotation data in NPL tasks of one or more disclosed embodiments.

Referring to FIG. 6, example results and operations 600 of the method 500 of one or more disclosed embodiments. An illustrated data set 602 of production tokenized data includes text comprising sentence tokens 1-8. The illustrated data set 602 represents example production tokenized data before the steps of merge candidates validation 550 of FIG. 5D and the execute merging 570 of FIG. 5E. For example, the illustrated data set 602 provides example production tokenized data (e.g., such as shown in the workflow 400 of FIG. 4 including the data set 416 of production tokenized data 418 produced by text classifier model 204 to be applied to the merging logic 424). As shown, the illustrated data set 602 includes a candidate_1={indexes: [3, 4, 5], score: 0.7}, and a candidate_2={indexes: [4, 5, 6], score: 0.9}. At block 604, system 200 performs the candidates validation merge step 550 of FIG. 5D and the execute merging step 570 of FIG. 5E. At block 604, system 200 selects the candidate having the higher similarity score and consolidates the tokens, (e.g., sentence tokens) in the merged sentences, which in this example system 200 selects candidate_2 and candidate_1 is removed from merging. An illustrated resulting data set 606 of production tokenized data, produced by system 200 at block 604, includes text comprising sentence tokens 1-3, merged sentence tokens 4, 5, and 6, and sentence tokens 7-8, as shown.

Figure 7:
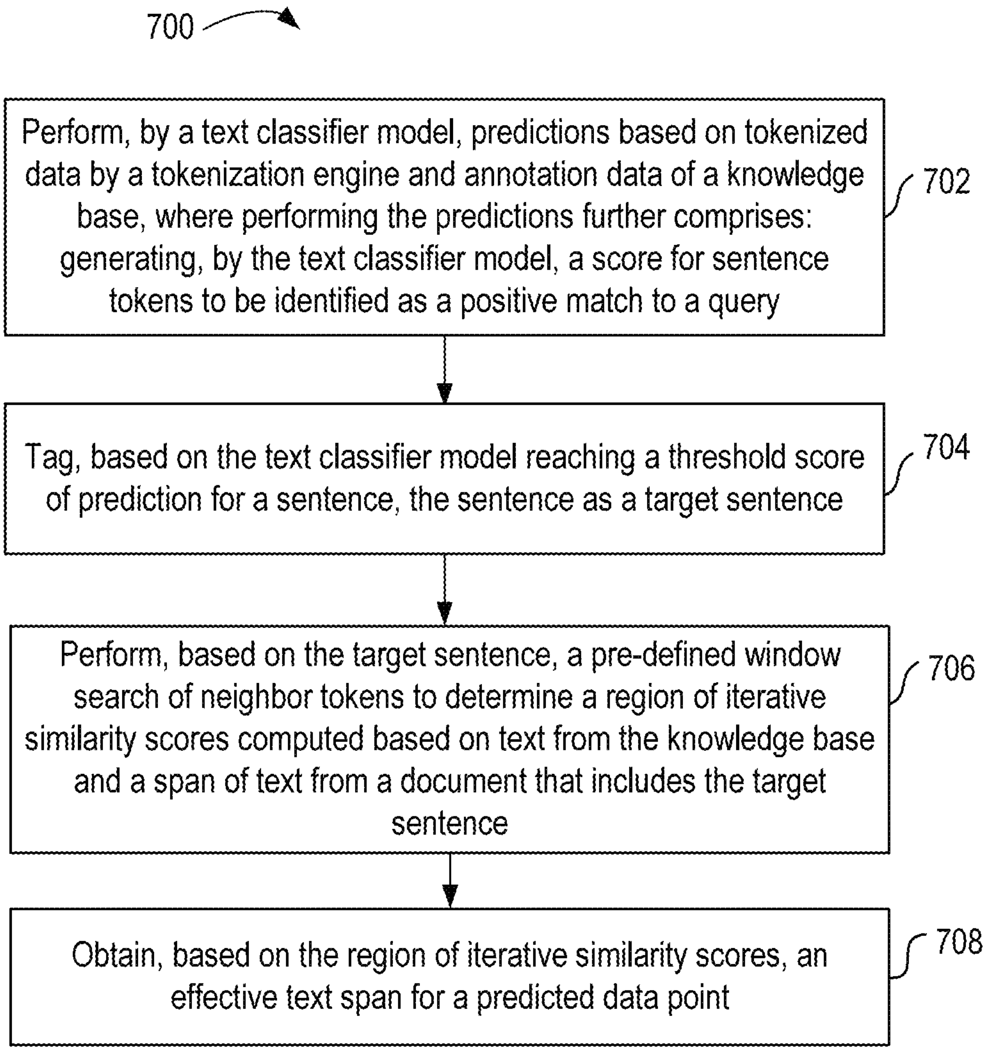
FIG. 7 is a flowchart illustrating example operations of a method for implementing an effective text span based on annotation data in NPL tasks of a disclosed embodiment.

FIG. 7 illustrates example operations of a method 700 for implementing optimal effective text size for tokenization of a disclosed embodiment. Method 700 can be implemented by system 200 in conjunction with the computer 101 of FIG. 1 and the Text Classifier Control Component 182 of disclosed embodiments.

At block 702, system 200 performs, by the text classifier model, predictions based on tokenized data by a tokenization engine and annotation data of a knowledge base, where performing the predictions further comprises: generating, by the text classifier model, a score for sentence tokens to be identified as a positive match to a query. In an embodiment, the text classifier model is trained with the tokenized data generated by the tokenization engine, and the annotation data of the knowledge base to process natural language processing tasks, where the annotation data includes annotation data by a subject matter expert (SME) at a business level of annotation. In an embodiment, generating, by the text classifier, the score for the sentence tokens to be identified as the positive match to the query further comprises identifying a label for the sentence tokens that represents an annotation attribute of a given data point to be identified as the positive match to the query. For example, the label comprises one or more of an entity identification, a time duration, a location, or privacy for the sentence tokens.

At block 704, system 200 tags, based on the text classifier model reaching a threshold score of prediction for a sentence, the sentence as a target sentence.

At block 706, system 200 performs, based on the target sentence, a pre-defined window search of neighbor tokens to determine a region of iterative similarity scores computed based on text from the knowledge base and a span of text from a document that includes the target sentence. The region of the iterative similarity scores is determined by computing the iterative similarity scores based on a similarity algorithm for composing and decomposing sentence tokens within the pre-defined window search around the target sentence. In an embodiment, performing, based on the target sentence, the pre-defined window search comprises using a target index of sentence tokens to select sentence tokens of the span of text from the document that includes the target sentence, and comparing the iterative similarity scores of the selected sentence tokens to identify one or more candidates of merged sentence tokens that have a maximum similarity score.

At block 708, system 200 obtains, based on the region of the iterative similarity scores, an effective text span for a predicted data point. In an embodiment, the composing and the decomposing the sentence tokens within the pre-defined window search further comprises merging a combination of contiguous sentences and tracking the iterative similarity scores; and identifying a text composition having a threshold prediction score to obtain the effective text span for the predicted data point for a given use case to process natural language processing tasks.

While the foregoing is directed to embodiments of the present disclosure, other and further embodiments may be devised without departing from the basic scope thereof, and the scope thereof is determined by the claims that follow.

What is claimed is:

1. A method comprising:
- performing, by a text classifier model, predictions based on tokenized data by a tokenization engine and annotation data of a knowledge base, wherein performing the predictions further comprises:
  - generating, by the text classifier model, a score for sentence tokens to be identified as a positive match to a query;
- tagging, based on the text classifier model reaching a threshold score of prediction for a sentence, the sentence as a target sentence;
- performing, based on the target sentence, a pre-defined window search of neighbor tokens to determine a region of iterative similarity scores computed based on text from the knowledge base and a span of text from a document that includes the target sentence; and
- obtaining, based on the region of iterative similarity scores, an effective text span for a predicted data point.

2. The method of claim 1, wherein the region of the iterative similarity scores is computed based on a similarity algorithm by composing and decomposing the sentence tokens within the pre-defined window search around the target sentence.

3. The method of claim 2, wherein the composing and the decomposing the sentence tokens further comprises merging a combination of contiguous sentences and tracking the iterative similarity scores; and identifying a text composition having a threshold prediction score to obtain the effective text span for the predicted data point for a given use case to process natural language processing tasks.

4. The method of claim 1, further comprising training the text classifier model, based on the tokenized data generated by the tokenization engine and the annotation data of the knowledge base, to process natural language processing (NLP) tasks, wherein the annotation data includes annotation data by a subject matter expert (SME) at a business level of annotation.

5. The method of claim 4, wherein the tokenized data generated by the tokenization engine and the annotation data of the knowledge base have a selected level for a given use case of a given domain for analysis and processing of the NLP tasks.

6. The method of claim 1, wherein performing, based on the target sentence, the pre-defined window search comprises using a target index of the sentence tokens to select the sentence tokens of the span of text from the document that includes the target sentence, and comparing the iterative similarity scores of the selected sentence tokens to identify one or more candidates of merged sentence tokens that have a maximum similarity score.

7. The method of claim 1, wherein generating, by the text classifier model, the score for the sentence tokens to be identified as the positive match to the query further comprises identifying a label for the sentence tokens that represents an annotation attribute of a given data point to be identified as the positive match to the query.

8. The method of claim 7, wherein the label comprises one or more of an entity identification, a duration, a location, or privacy for the sentence tokens.

9. The method of claim 1, wherein performing, based on the target sentence, the pre-defined window search of the neighbor tokens comprises producing a production tokenized data set of production sentence tokens from the document that includes the target sentence, and producing a target sentence data set of target sentence tokens from the production tokenized data set.

10. The method of claim 9, further comprising applying the production sentence tokens and the target sentence tokens to merging logic that uses a similarity function to perform the pre-defined window search, and retrieves merged sentence tokens that have a maximum similarity score.

11. A system, comprising:
- one or more processors; and a memory, wherein the memory includes a computer program product configured to perform operations for identifying an effective text size for tokenization based on annotated data, the operations comprising:
- performing, by a text classifier model, predictions based on tokenized data by a tokenization engine and annotation data of a knowledge base, wherein performing the predictions further comprises:
  - generating, by the text classifier model, a score for sentence tokens to be identified as a positive match to a query;
- tagging, based on the text classifier model reaching a threshold score of prediction for a sentence, the sentence as a target sentence;
- performing, based on the target sentence, a pre-defined window search of neighbor tokens to determine a region of iterative similarity scores computed based on text from the knowledge base and a span of text from a document that includes the target sentence; and
- obtaining, based on the region of iterative similarity scores, an effective text span for a predicted data point.

12. The system of claim 11, wherein the region of the iterative similarity scores is computed based on a similarity algorithm by composing and decomposing the sentence tokens within the pre-defined window search around the target sentence.

13. The system of claim 12, wherein the composing and decomposing the sentence tokens further comprises merging a combination of contiguous sentences and tracking the iterative similarity scores; and identifying a text composition having a threshold prediction score to obtain the effective text span for the predicted data point for a given use case to process natural language processing tasks.

14. The system of claim 11, wherein performing, based on the target sentence, the pre-defined window search comprises using a target index of the sentence tokens to select the sentence tokens of the span of text from the document that includes the target sentence, and comparing the iterative similarity scores of the selected sentence tokens to identify one or more candidates of merged sentence tokens that have a maximum similarity score.

15. The system of claim 11, wherein generating, by the text classifier model, the score for the sentence tokens to be identified as the positive match to the query further comprises identifying a label for the sentence tokens that represents an annotation attribute of a given data point to be identified as the positive match to the query, wherein the label comprises one or more of an entity identification, a duration, a location, or privacy for the sentence tokens.

16. A computer program product comprising:

a non-transitory computer-readable storage medium having computer-readable program code embodied therewith, the computer-readable program code executable by one or more computer processors to perform operations comprising:

performing, by a text classifier model, predictions based on tokenized data by a tokenization engine and annotation data of a knowledge base, wherein performing the predictions further comprises:

generating, by the text classifier model, a score for sentence tokens to be identified as a positive match to a query;

tagging, based on the text classifier model reaching a threshold score of prediction for a sentence, the sentence as a target sentence;

performing, based on the target sentence, a pre-defined window search of neighbor tokens to determine a region of iterative similarity scores computed based on text from the knowledge base and a span of text from a document that includes the target sentence; and obtaining, based on the region of iterative similarity scores, an effective text span for a predicted data point.

17. The computer program product of claim 16, wherein the region of the iterative similarity scores is computed based on a similarity algorithm by composing and decomposing the sentence tokens within the pre-defined window search around the target sentence.

18. The computer program product of claim 17, wherein the composing and decomposing the sentence tokens further comprises merging a combination of contiguous sentences and tracking the iterative similarity scores; and identifying a text composition having a threshold prediction score to obtain the effective text span for the predicted data point for a given use case to process natural language processing tasks.

19. The computer program product of claim 16, wherein performing, based on the target sentence, the pre-defined window search comprises using a target index of the sentence tokens to select the sentence tokens of the span of text from the document that includes the target sentence, and comparing the iterative similarity scores of the selected sentence tokens to identify one or more candidates of merged sentence tokens that have a maximum similarity score.

20. The computer program product of claim 16, wherein generating, by the text classifier model, the score for the sentence tokens to be identified as the positive match to the query further comprises identifying a label for the sentence tokens that represents an annotation attribute of a given data point to be identified as the positive match to the query, wherein the label comprises one or more of an entity identification, a duration, a location, or privacy for the sentence tokens.

* * * * *